US011746899B2

(12) United States Patent
Choi et al.

(10) Patent No.: US 11,746,899 B2
(45) Date of Patent: Sep. 5, 2023

(54) TRANSMISSION WITH 1 AXIS SHIFT MECHANISM

(71) Applicant: NEOOTO CO., LTD., Seoul (KR)

(72) Inventors: Duk Soon Choi, Chungcheongnam-do (KR); Yun Sik Jeong, Chungcheongnam-do (KR); Sun Hyun Kim, Seoul (KR)

(73) Assignee: NEOOTO CO., LTD., Seoul (KR)

( * ) Notice: Subject to any disclaimer, the term of this patent is extended or adjusted under 35 U.S.C. 154(b) by 0 days.

(21) Appl. No.: 17/903,048

(22) Filed: Sep. 6, 2022

(65) Prior Publication Data
US 2023/0077157 A1   Mar. 9, 2023

(30) Foreign Application Priority Data
Sep. 7, 2021  (KR) .................. 10-2021-0118963

(51) Int. Cl.
*F16H 63/32*  (2006.01)
*F16H 63/30*  (2006.01)

(52) U.S. Cl.
CPC ..... *F16H 63/32* (2013.01); *F16H 2063/3079* (2013.01)

(58) Field of Classification Search
CPC ............. F16H 63/32; F16H 2063/3079; F16H 2063/321
See application file for complete search history.

(56) References Cited

U.S. PATENT DOCUMENTS

| 6,173,624 | B1 * | 1/2001 | Decker | F16H 63/32 |
| | | | | 475/269 |
| 7,717,010 | B2 * | 5/2010 | Bar | F16H 63/304 |
| | | | | 74/335 |
| 9,657,837 | B2 * | 5/2017 | Showalter | F16H 63/304 |

FOREIGN PATENT DOCUMENTS

KR         4568447        10/2010

* cited by examiner

*Primary Examiner* — Randell J Krug
(74) *Attorney, Agent, or Firm* — JCIPRNET (57) ABSTRACT

A transmission including a one-axis shift mechanism is provided. The transmission including a one-axis shift mechanism includes a transmission including a shift mechanism in which a shift fork is slidably coupled to a shift rail, and the shift fork includes a sleeve that allows the shift fork to be meshed with a gear portion coupled to an input shaft, the transmission including a motor, a first shift gear which is connected to the motor and moves according to rotation of the motor, a second shift gear arranged at one end of the shift rail and secured to the first shift gear, and a sliding pin arranged at the other end of the shift rail and configured to slide the shift fork by contacting a sliding protrusion arranged around an insertion hole of the shift fork, into which the shift rail is inserted.

6 Claims, 6 Drawing Sheets

TRANSMISSION WITH 1 AXIS SHIFT MECHANISM

TECHNICAL FIELD

The disclosure relates to a transmission, and more particularly, to a transmission including a shift mechanism whereby both rotary motion and sliding motion are implemented on one axis.

BACKGROUND ART

Dog clutches are a type of clutch that connects two rotating elements by a method other than friction. Dog clutches are designed such that one element pushes the other and both are rotated at the same speed without sliding.

In general, in an automobile transmission, a dog clutch is implemented as a mechanism for converting a rotary motion of a motor into a sliding motion through a lug portion of a shift fork assembled on a shift rail. A shift fork in sliding motion moves a sleeve, thereby transmitting or blocking power.

However, such type of shift mechanism requires various types of parts to change the rotary motion into the sliding motion, which causes a problem in that the volume of the shift mechanism itself and the transmission is increased.

The related art described above is a technique that the inventor had to derive the disclosure or technical information acquired during the process of deriving the same, and is not necessarily a technique known to the general public prior to the filing of the disclosure.

PRIOR ART DOCUMENT

Patent Document (Patent document 1) JP 4568447 B2

DESCRIPTION OF THE INVENTION

Problem to be Solved

One or more embodiments include a transmission including a one-axis shift mechanism for simultaneously implementing both a rotary motion and a sliding motion on one axis to thereby reduce the number of parts and the volume of the shift mechanism and the transmission.

However, the above objectives are exemplary, and the disclosure is not limited by the above objectives.

Means for Solving Problem

According to one or more embodiments, a transmission including a one-axis shift mechanism includes a transmission including a shift mechanism in which a shift fork is slidably coupled to a shift rail, and the shift fork includes a sleeve that allows the shift fork to be meshed with a gear portion coupled to an input shaft, the transmission including a motor, a first shift gear which is connected to the motor and moves according to rotation of the motor, a second shift gear arranged at one end of the shift rail and secured to the first shift gear, and a sliding pin arranged at the other end of the shift rail and configured to slide the shift fork by contacting a sliding protrusion arranged an insertion hole of the shift fork, into which the shift rail is inserted.

The sliding protrusion may protrude from a region around the insertion hole, and the sliding pin may rotate according to rotation of the second shift gear and come into contact with an upper surface of the sliding protrusion to slide the shift fork in a longitudinal direction.

The shift fork may include a bottom surface on which the sliding protrusion is arranged and a support wall extending along edges of the bottom surface to surround the sliding protrusion, and the sliding pin may be arranged within the support wall and extends from the other end of the shift rail by a length shorter than an inner diameter of the support wall, and selectively come into contact with the bottom surface or the upper surface of the sliding protrusion according to rotation of the second shift gear to move the shift fork by a height difference between the bottom surface and the sliding protrusion.

The sliding protrusion may extend along the edges of the bottom surface and have both ends inclined toward the bottom surface.

A plane of the sliding protrusion, which extends in a circumferential direction of the support wall, may have a first contact surface and a second contact surface extending from the first contact surface at a tilt toward the bottom surface, and as the motor rotates and the sliding pin passes by the second contact surface and reaches the first contact surface, the shift fork may be secured to the gear portion.

The transmission may further include a return spring arranged between the shift fork and the second shift gear and wound around the shift rail.

One end of the return spring may be fixed to one side of an outer circumferential surface of the shift rail, and the other end of the return spring may be in contact with a surface of the shift fork located opposite to the sliding pin.

When the sliding pin contacts the sliding protrusion, the return spring may be compressed by a height of the sliding protrusion, and when the contact state between the sliding pin and the sliding protrusion is released, the return spring may press the shift fork to move the shift fork to an original position.

In addition to the aforesaid details, other aspects, features, and advantages will be clarified from the following drawings, claims, and detailed description.

Effects of the Invention

According to the transmission having a one-axis shift mechanism, according to an embodiment, both a rotary motion and a sliding motion may be implemented on one axis, thereby simplifying the configuration of the shift mechanism and the transmission including the same and reducing the size thereof.

MODE FOR CARRYING OUT THE INVENTION

As the disclosure allows for various changes and numerous embodiments, particular embodiments will be illustrated in the drawings and described in detail in the description. However, this is not intended to limit the disclosure to particular embodiments, and it is to be appreciated that all changes, equivalents, and substitutes that do not depart from the spirit and technical scope of the disclosure are encompassed in the disclosure. In the description of the disclosure, even though shown in other embodiments, the same reference numerals are used for the same components.

Hereinafter, embodiments will be described in detail with reference to the accompanying drawings, and in the description with reference to the drawings, like reference numerals denote like elements, and redundant description thereof will be omitted.

It will be understood that although the terms "first," "second," etc. may be used herein to describe various elements, these elements should not be limited by these terms. These terms are only used to distinguish one element from another.

Singular expressions, unless defined otherwise in contexts, include plural expressions.

In the embodiments below, it will be further understood that the terms "comprise" and/or "have" used herein specify the presence of stated features or elements, but do not preclude the presence or addition of one or more other features or elements.

Also, in the drawings, for convenience of description, sizes of elements may be exaggerated or contracted. For example, since sizes and thicknesses of elements in the drawings are arbitrarily illustrated for convenience of explanation, the disclosure is not limited thereto.

In the embodiments below, an x-axis, a y-axis, and a z-axis are not limited to three axes on a rectangular coordinates system but may be construed as including these axes. For example, an-x axis, a y-axis, and a z-axis may be at right angles or may also indicate different directions from one another, which are not at right angles.

When an embodiment is implementable in another manner, a predetermined process order may be different from a described one. For example, two processes that are consecutively described may be substantially simultaneously performed or may be performed in an opposite order to the described order.

The terms used in the present specification are merely used to describe particular embodiments, and are not intended to limit the disclosure. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 1:
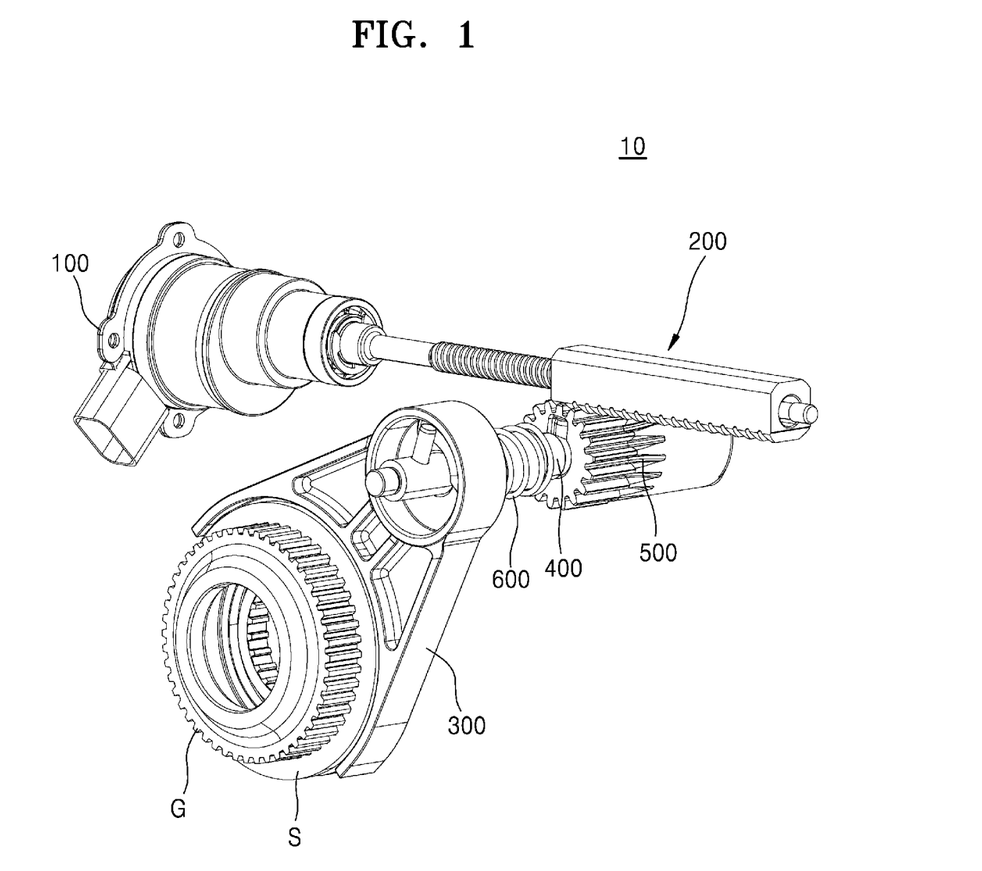
FIG. 1 illustrates a portion of a transmission according to an embodiment.
Figure 2:
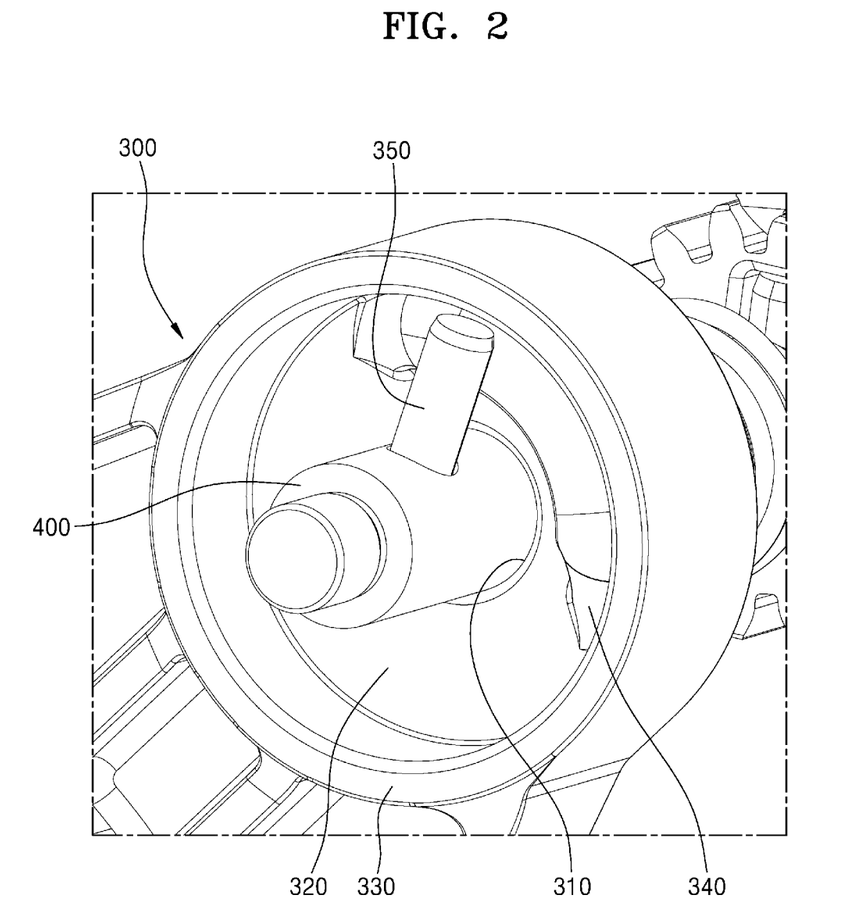
FIG. 2 is an enlarged view of the vicinity of a sliding pin of FIG. 1.
Figure 3:
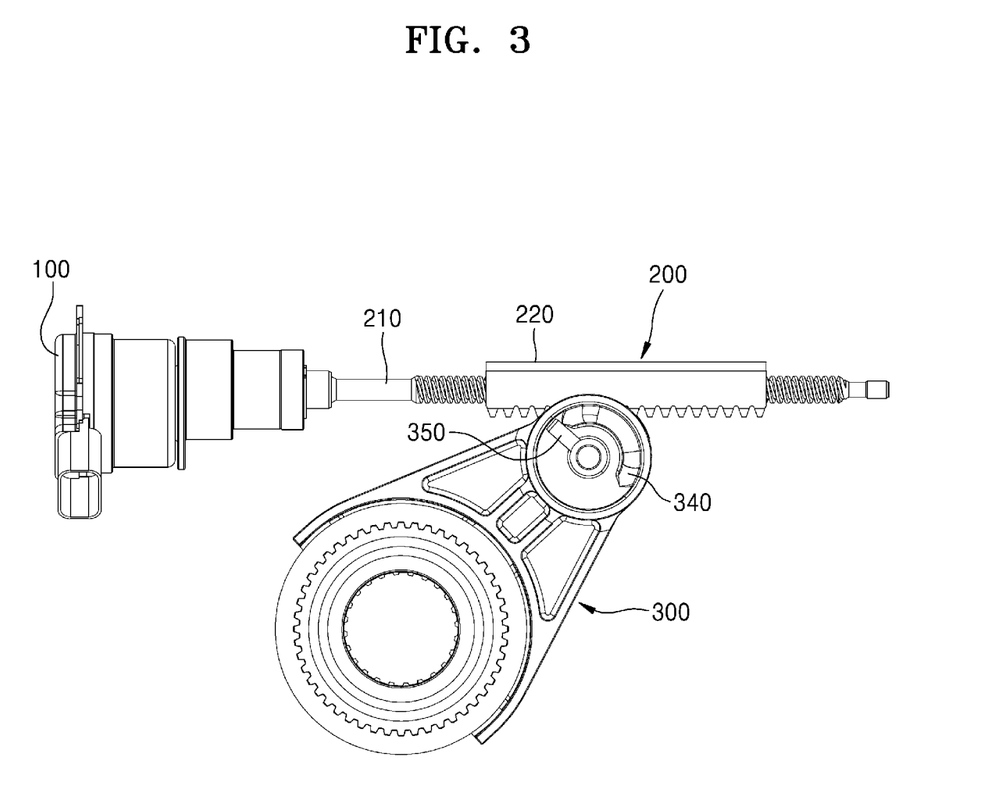
FIGS. 3 and 4 illustrate a state before the sliding pin comes into contact with a sliding protrusion.
Figure 4:
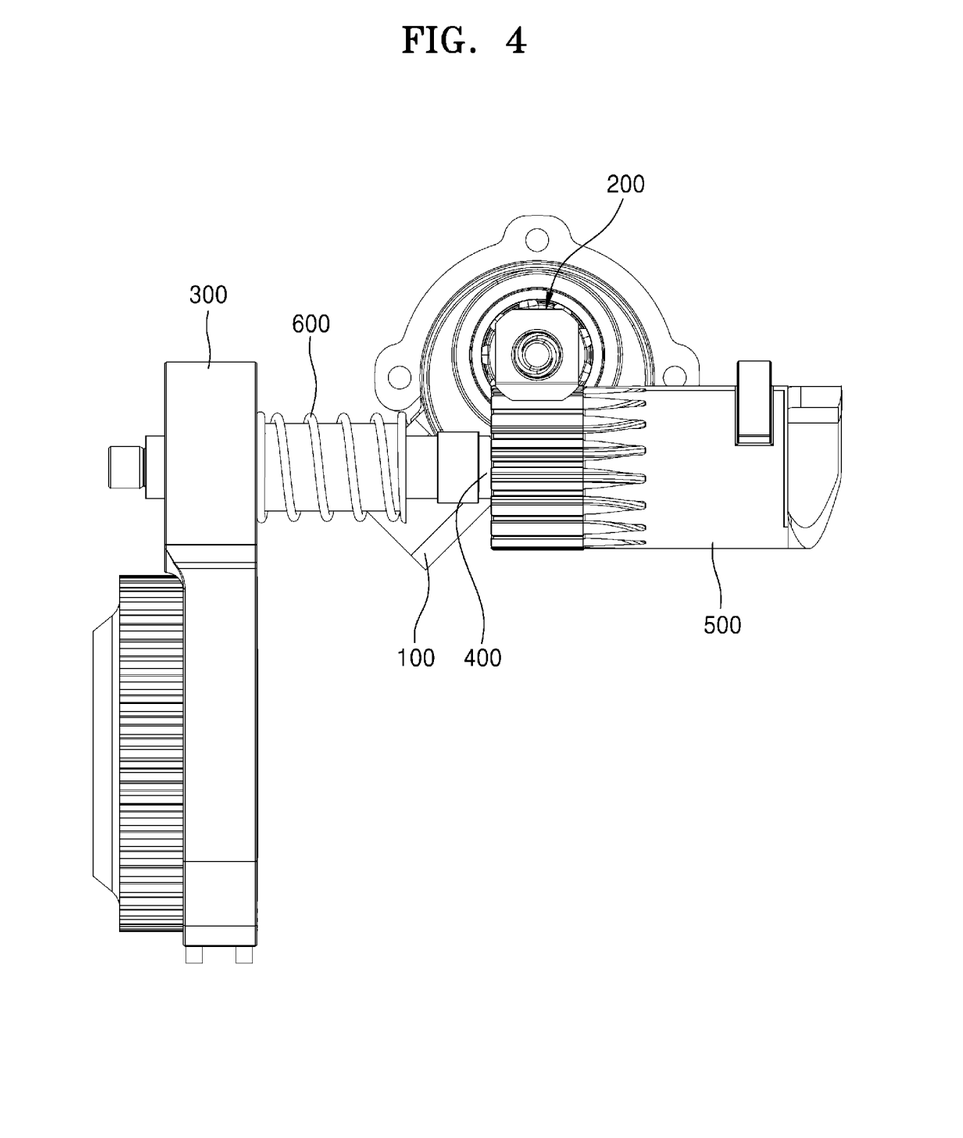
Figure 5:
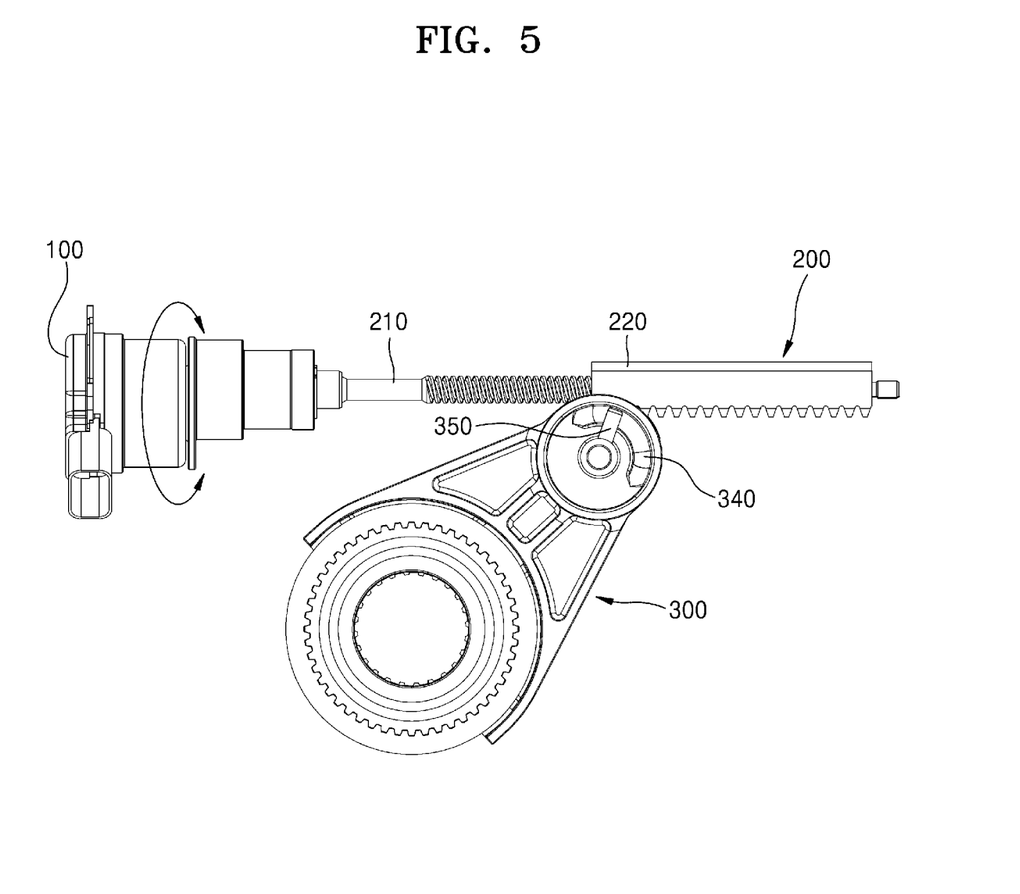
FIGS. 5 and 6 illustrate a state after the sliding pin comes into contact with the sliding protrusion.
Figure 6:
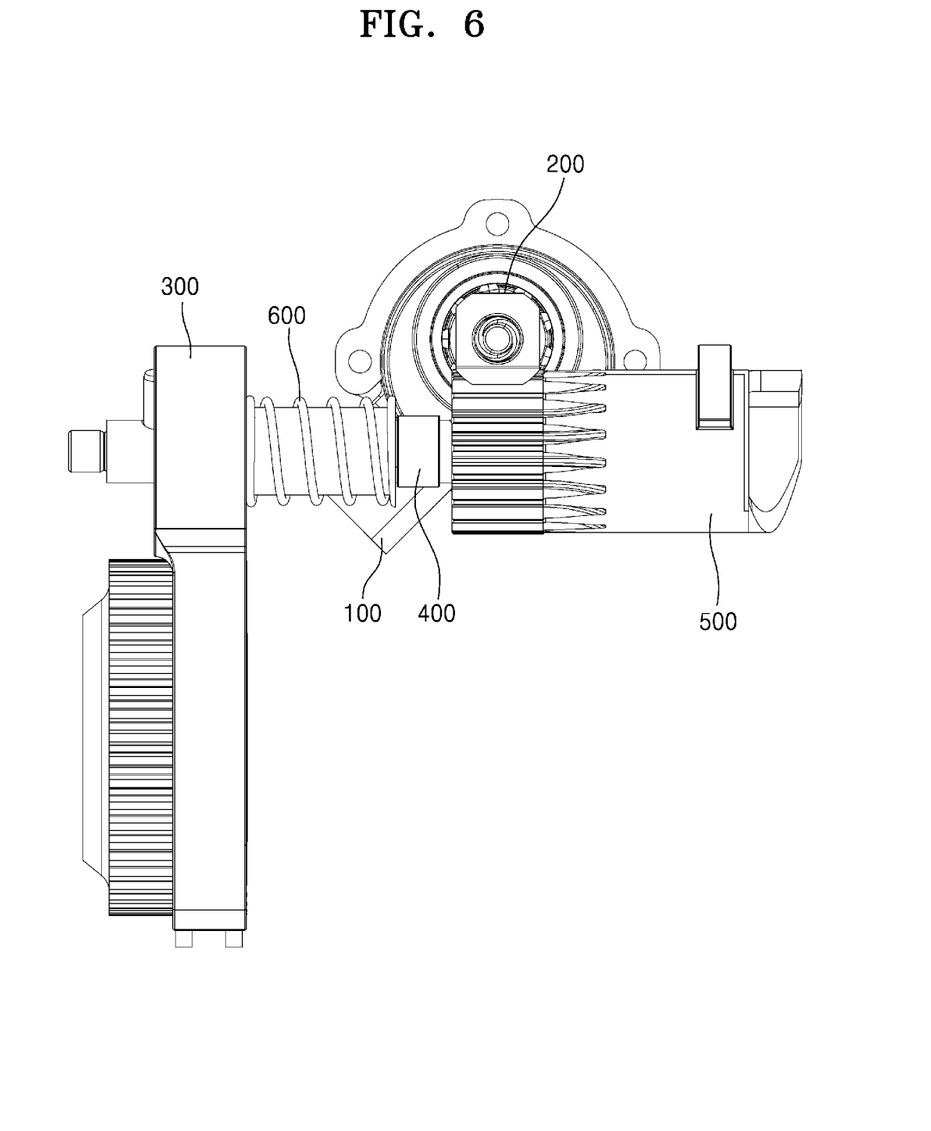

FIG. 1 illustrates a portion of a transmission 10 according to an embodiment. FIG. 2 is an enlarged view of the vicinity of a sliding pin 350 of FIG. 1. FIGS. 3 and 4 illustrate a state before the sliding pin 350 comes into contact with a sliding protrusion 340. FIGS. 5 and 6 illustrate a state after the sliding pin 350 comes into contact with the sliding protrusion 340.

Referring to FIGS. 1 to 6, the transmission 10 according to an embodiment includes a transmission including a one-axis shift mechanism. That is, the transmission 10 according to an embodiment may include a shift mechanism whereby both a rotary motion and a sliding motion may be implemented on one axis.

The shift mechanism described in the description of the disclosure may refer to a structure of the transmission 10, which receives power from a motor 100 to perform a gear changing operation. For example, the shift mechanism may include the motor 100, a first shift gear 200, a shift fork 300, a shift rail 400, and a second shift gear 500. Also, the transmission 10 includes the shift mechanism as described above, and may be a generic concept that further includes a transmission case, an input shaft, an output shaft, or the like.

The transmission 10 according to an embodiment may include the motor 100, the first shift gear 200, the shift fork 300, the shift rail 400, and the second shift gear 500. While not illustrated in FIGS. 1 to 6, the transmission 10 may include an input shaft that is selectively connected to the shift fork 300 and includes at least one gear portion. The input shaft may be a shaft that receives power from the outside to directly drive a gear portion. Accordingly, while moving forward and backward, the shift fork 300 may be selectively meshed with a gear portion to perform a gear changing operation.

In addition, a transmission case (not shown) may be arranged opposite the second shift gear 500 with respect to the shift fork 300, that is, at the opposite end of the second shift gear 500 with respect to the shift rail 400.

The motor 100 receives power from the outside and generates power to move the shift fork 300. Here, the motor 100 may not be a motor that inputs power, but a motor that operates a shift mechanism to perform a gear changing operation. For example, when the motor 100 rotates clockwise or counterclockwise, the first shift gear 200 connected to one end of the motor 100 moves to rotate the second shift gear 500 and move the shift fork 300. This will be described later in detail.

The type of the motor 100 is not particularly limited, and may include a hydraulic, pneumatic or electric motor. In an embodiment, the motor 100 may be an electric motor that rotates by receiving electric power from the outside.

The first shift gear 200 is connected to the motor 100 and may move in association with the rotation of the motor 100. For example, as illustrated in FIG. 1, the first shift gear 200 may include a connection bar 210 having one end connected to the motor 100 and a conversion gear 220 arranged at the other end of the connection bar 210.

The connection bar 210 is a bar-shaped member, and a bearing (e.g., a ball bearing) may be arranged at a portion of one end of the connection bar 210 connected to the motor 100. In addition, a screw thread may be formed on an outer circumferential surface of the connection bar 210.

The conversion gear 220 is a member that is arranged on the other end of the connection bar 210 and is movable relative to the connection bar 210, and may include, on an inner circumferential surface thereof, a screw thread coupled to a screw thread formed on the outer circumferential surface of the connection bar 210. For example, the conversion gear 220 has a hollow inside, and the connection bar 210 may be inserted therein. And the connection bar 210 may have, on the outer circumferential surface thereof, a gear secured to the second shift gear 500.

Accordingly, when the motor 100 rotates, the connection bar 210 also rotates in the same direction. Here, the motor 100 may be arranged to rotate about a rotational axis but not to move in an axial direction. Accordingly, in a state in which displacement of the motor 100 in a direction of the rotation axis does not occur, the conversion gear 220 is secured to the connection bar 210 to move forward and backward in the direction of the rotational axis. Through this, the first shift gear 200 may convert the rotary motion of the motor 100 into a linear motion and transmit the same to the second shift gear 500.

The second shift gear 500 is arranged at one end of the shift rail 400, and may include a gear secured to the first shift gear 200 on an outer circumferential surface thereof. For example, the second shift gear 500 may include a cylindrical member having a gear formed on an outer circumferential surface thereof, and may be rotated as the first shift gear 200 moves forward and backward. That is, the first shift gear 200 and the second shift gear 500 may form a kind of rack-and-pinion gear structure.

The shift rail 400 is a member that connects the second shift gear 500 to the shift fork 300, and has a function of transmitting motion of the motor 100 to the shift fork 300. The shift rail 400 is a bar-shaped member, and may include a single shaft. The second shift gear 500 may be coupled to one end of the shift rail 400, and the other end of the shift rail 400 may be connected to the shift fork 300.

In an embodiment, when the first shift gear 200 moves as the motor 100 rotates, the second shift gear 500 is rotated accordingly, and the shift rail 400 is also rotated.

The shift fork 300 is connected to the other end of the shift rail 400 and moves in the axial direction according to the operation of the motor 100, while the shift rail 400 is inserted into the shift fork 300. For example, as the motor 100 rotates, the first shift gear 200 is moved, and accordingly, the second shift gear 500 and the shift rail 400 are rotated, and the sliding pin 350 to be described later comes into contact with the sliding protrusion 340. In addition, the shift fork 300 moves in the axial direction as much as a height of the sliding protrusion 340 and is secured to the gear portion of the input shaft (not shown) to perform a gear changing operation.

In an embodiment, the shift fork 300 may include a sleeve S and a clutch gear G. The shift fork 300 may be selectively secured to the gear portion while moving according to the rotation of the motor 100. For example, when the motor 100 rotates in one direction and the shift fork 300 moves toward the gear portion of the input shaft, the clutch gear G is secured to the gear portion, thereby performing a gear change.

In an embodiment, the shift fork 300 may include an insertion hole 310 into which the shift rail 400 is inserted. In addition, the shift fork 300 may include a bottom surface 320 arranged around the insertion hole 310 and have, on an inner portion thereof, a support wall 330 arranged along the edges of the bottom surface 320 to surround the insertion hole 310.

The bottom surface 320 is a flat surface arranged in a direction opposite to a direction in which the shift rail 400 is inserted, and may selectively contact the sliding pin 350 which is to be described later. Also, the support wall 330 is a partition wall protruding along the edges of the bottom surface 320, and the insertion hole 310 may be arranged therein. The sliding protrusion 340 may be formed to protrude at a certain height from the bottom surface 320 around the insertion hole 310.

Accordingly, in a state in which the shift rail 400 is inserted into the insertion hole 310, when the sliding pin 350 arranged at the other end of the shift rail 400 selectively comes into contact with the bottom surface 320 or the sliding protrusion 340, the shift fork 300 is moved in the axial direction.

For example, FIGS. 3 and 4 illustrate a state in which the motor 100 does not rotate. In this state, the conversion gear 220 of the first shift gear 200 is arranged at a center or a left side with respect to a longitudinal direction of the connection bar 210. In addition, the second shift gear 500 also maintains a non-rotated state, and the sliding pin 350 comes into contact with the bottom surface 320 of the shift fork 300. In this state, the shift fork 300 may not be secured to the gear portion.

FIGS. 5 and 6 illustrate a state in which the motor 100 rotates in a clockwise or counterclockwise direction. As the motor 100 rotates, the connection bar 210 also rotates in the same direction and by the same amount, and the conversion gear 220 secured to the screw thread of the connection bar 210 moves in the axial direction. Since a gear formed on an outer surface of the conversion gear 220 is engaged with the gear of the second shift gear 500, when the conversion gear 220 moves, the second shift gear 500 rotates and the shift rail 400 also rotates in the same manner.

And as illustrated in FIG. 5, the sliding pin 350 arranged at the other end of the shift rail 400 rotates and comes into contact with the sliding protrusion 340. The sliding protrusion 340 protrudes by a certain height with respect to the bottom surface 320, and thus, the shift fork 300 is moved in the axial direction (moved to the right in FIG. 6) by a height difference between the sliding protrusion 340 and the bottom surface 320. Accordingly, the shift fork 300 is secured to the gear portion, thereby performing a gear changing operation.

In an embodiment, the transmission 10 may further include a return spring 600.

As illustrated in FIGS. 3 to 6, the return spring 600 may be wound around the shift rail 400. One end of the return spring 600 may be fixed to one side of an outer circumferential surface of the shift rail 400, and the other end thereof may be in contact with one surface of the shift fork 300.

As illustrated in FIGS. 3 and 4, in a state in which the shift fork 300 is not secured to the gear portion of the input shaft because the motor 100 does not rotate, the return spring 600 may be maintained in a not compressed state or a slightly compressed state.

Also, as illustrated in FIGS. 5 and 6, when the motor 100 rotates and the shift fork 300 moves, the sliding pin 350 comes into contact with the sliding protrusion 340, the shift fork 300 presses the other end of the return spring 600 to thereby compress the return spring 600. Here, a compression force of the return spring 600 may be less than a force of the shift fork 300 to maintain a secured state with respect to the gear portion or a force of the sliding pin 350 in contact with the sliding protrusion 340. That is, even when the return spring 600 is compressed, unless the motor 100 does not rotate in the opposite direction to cause a change in a contact state (area or pressing force) between the sliding pin 350 and the sliding protrusion 340, the secured state between the shift fork 300 and the gear portion of the input shaft may be maintained.

After that, when the motor 100 rotates in the opposite direction again, the contact state between the sliding pin 350 and the sliding protrusion 340 is released, and the return spring 600 presses the shift fork 300 to the original position (left direction in FIG. 6). Accordingly, the shift fork 300 releases the secured state with respect to the gear portion.

Through the configuration as above, according to the transmission 10 according to an embodiment, both a rotary motion and a sliding motion may be implemented on one axis. That is, as one shift rail 400 rotates, the shift fork 300 may be simultaneously slid through the sliding pin 350 and the sliding protrusion 340. Thus, the configuration of the shift mechanism and the transmission 10 may be simplified and the overall size thereof may be reduced.

Certain technical details described with reference to the embodiments are an embodiment and do not limit the technical scope of the embodiments. In order to concisely and clearly describe the disclosure, descriptions of general techniques and configurations according to the related art may be omitted. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The embodiments are not necessarily limited by the order of description of the above steps. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those skilled in this art without departing from the spirit and scope of the disclosure.

EXPLANATION OF REFERENCE NUMERALS

10: transmission
100: motor
200: first shift gear
300: shift fork
400: shift rail
500: second shift gear
600: return spring

The invention claimed is:

1. A transmission including a shift mechanism in which a shift fork is slidably coupled to a shift rail, and the shift fork includes a sleeve that allows the shift fork to be meshed with a gear portion coupled to an input shaft, the transmission comprising:
   a motor;
   a first shift gear which is connected to the motor and moves according to rotation of the motor;
   a second shift gear arranged at one end of the shift rail and secured to the first shift gear; and
   a sliding pin arranged at the other end of the shift rail and configured to slide the shift fork by contacting a sliding protrusion arranged around an insertion hole of the shift fork, into which the shift rail is inserted,
   wherein the sliding protrusion protrudes from a bottom surface arranged around the insertion hole, and
   the sliding pin rotates according to rotation of the second shift gear and comes into contact with an upper surface of the sliding protrusion to slide the shift fork in a longitudinal direction, and
   wherein the shift fork includes the bottom surface on which the sliding protrusion is arranged and a support wall extending along edges of the bottom surface to surround the sliding protrusion, and
   the sliding pin is arranged within the support wall and extends from the other end of the shift rail by a length shorter than an inner diameter of the support wall, and selectively comes into contact with the bottom surface or the upper surface of the sliding protrusion according to rotation of the second shift gear to move the shift fork by a height difference between the bottom surface and the sliding protrusion.

2. The transmission of claim 1, further comprising a return spring arranged between the shift fork and the second shift gear and wound around the shift rail.

3. The transmission of claim 2, wherein one end of the return spring is fixed to one side of an outer circumferential surface of the shift rail, and the other end of the return spring is in contact with a surface of the shift fork located opposite to the sliding pin.

4. The transmission of claim 3, wherein when the sliding pin contacts the sliding protrusion, the return spring is compressed by a height of the sliding protrusion, and
   when the contact state between the sliding pin and the sliding protrusion is released, the return spring presses the shift fork to move the shift fork to an original position.

5. The transmission of claim 1, wherein the sliding protrusion extends along the edges of the bottom surface and has both ends inclined toward the bottom surface.

6. The transmission of claim 5, wherein a plane of the sliding protrusion, which extends in a circumferential direction of the support wall, has a first contact surface and a second contact surface extending from the first contact surface at a tilt toward the bottom surface, and
   as the motor rotates and the sliding pin passes by the second contact surface and reaches the first contact surface, the shift fork is secured to the gear portion.

* * * * *